United States Patent
Lemelson et al.

(10) Patent No.: US 6,608,972 B1
(45) Date of Patent: *Aug. 19, 2003

(54) PLAY AND RECORD AUDIO SYSTEM EMBEDDED INSIDE A PHOTOGRAPH

(76) Inventors: Jerome H. Lemelson, deceased, late of Incline Village, NV (US) 89451; by Dorothy Lemelson, executrix, Unit 802, Suite 286, 930 Tahoe Blvd., Incline Village, NV (US) 89451; John H. Hiett, 17625 N. Seventh St., Phoenix, AZ (US) 85022

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/090,682

(22) Filed: Jun. 4, 1998

(51) Int. Cl.⁷ .............................................. G03B 17/24
(52) U.S. Cl. .......................... 396/312; 396/319; 40/717
(58) Field of Search ................................ 396/310, 312, 396/319; 40/717

(56) References Cited

U.S. PATENT DOCUMENTS

| | | | |
|---|---|---|---|
| 3,244,065 A | 4/1966 | Lemelson | 88/24 |
| 3,934,268 A | 1/1976 | Uemura | 360/101 |
| 4,020,503 A | 4/1977 | Gerry | 360/1 |
| 4,021,857 A | 5/1977 | Tanimura | 360/84 |
| 4,038,691 A | 7/1977 | Gerry | 360/2 |
| 4,102,067 A | 7/1978 | Tarrant | 40/455 |
| 4,131,919 A | 12/1978 | Lloyd et al. | 360/9 |
| 4,310,838 A | 1/1982 | Juso et al. | 340/701 |
| 4,381,558 A | 4/1983 | Bearden | 369/68 |
| 4,473,280 A | 9/1984 | Staar | 353/19 |
| 4,480,273 A | 10/1984 | Fujiki | 360/19.1 |
| 4,531,161 A | 7/1985 | Murakoshi | 360/10.1 |
| 4,541,021 A | 9/1985 | Konishi et al. | 360/35.1 |

(List continued on next page.)

OTHER PUBLICATIONS

"New intelligent printing techniques, A revolution in security, data handling, diagnostics and display," by Dr. Peter Harrop, www.isiselec.demon.co.uk/books/printing/, downloaded Sep. 28, 1997.

"New intelligent printing techniques, A guide to exploiting new technologies," by Dr. Peter Harrop, www.rbrldn.demon.co.uk/inprbro.htm, downloaded Sep. 28, 1997.

(List continued on next page.)

Primary Examiner—David M. Gray
(74) Attorney, Agent, or Firm—Douglas W. Rudy; Edwin A. Suominen (57) ABSTRACT

An audio photograph or picture 2 made of a photograph or picture material 6 having an image area 12 for providing at least one photographic or picture image and further having an audio system 4 embedded within the photograph or picture material 6. The audio system 4 comprises a recording system for recording and storing audio information and a playback system for playing audio information. The components of the audio system 4 are made from ultra-thin, compact, and flexible materials, and these components are made paper-thin. The audio system 4 further comprises a power source, a micro-controller 20 for controlling recording and playing of audio information wherein the micro-controller 20 is coupled to the power source 10, a storage memory 24 coupled to the micro-controller 20 for storing the audio information, a recording system coupled to the micro-controller 20 for picking up and storing the audio information in the storage memory 24, and a playback system coupled to the micro-controller 20 for playing the audio information stored in the storage memory 24. The embedded audio system 4 is able to receivingly couple to an audio device for transferring the audio information between the audio device and the storage memory 24 of the audio system 4.

15 Claims, 4 Drawing Sheets

U.S. PATENT DOCUMENTS

| | | | |
|---|---|---|---|
| 4,541,188 A | 9/1985 | Sadorus | 40/152.1 |
| 4,571,641 A | 2/1986 | Fujiki et al. | 360/19.1 |
| 4,580,779 A | 4/1986 | Kanamaru et al. | 273/1 E |
| 4,602,296 A | 7/1986 | Murakoshi | 360/10.1 |
| 4,604,668 A | 8/1986 | Lemelson | 360/10.1 |
| 4,633,323 A | 12/1986 | Haberkern et al. | 358/254 |
| 4,659,319 A | 4/1987 | Blair | 446/87 |
| 4,706,134 A | 11/1987 | Jinguji | 358/343 |
| 4,725,897 A | 2/1988 | Konishi | 360/10.1 |
| 4,746,993 A | 5/1988 | Tada | 358/335 |
| 4,792,866 A | 12/1988 | Hirobe et al. | 360/10.1 |
| 4,816,928 A | 3/1989 | Sasaki et al. | 360/35.1 |
| 4,819,101 A | 4/1989 | Lemelson | 360/10.1 |
| 4,828,105 A | 5/1989 | Silengo et al. | 206/232 |
| 4,860,122 A | 8/1989 | Kanamaru | 358/341 |
| 4,901,096 A | 2/1990 | Lemelson | 354/268 |
| 4,905,029 A | 2/1990 | Kelley | 354/76 |
| 4,983,996 A | 1/1991 | Kinoshita | 354/76 |
| 4,994,659 A * | 2/1991 | Yabe et al. | 235/492 |
| 5,032,918 A | 7/1991 | Ota et al. | 358/209 |
| 5,045,327 A | 9/1991 | Tarlow et al. | 381/51 |
| 5,063,587 A | 11/1991 | Semasa et al. | 379/53 |
| 5,063,698 A | 11/1991 | Johnson et al. | 40/124.1 |
| 5,126,893 A | 6/1992 | Choi | 360/67 |
| 5,146,353 A | 9/1992 | Isoguchi et al. | 358/909 |
| 5,260,795 A | 11/1993 | Sakai et al. | 358/209 |
| 5,260,837 A | 11/1993 | Lemelson | 360/35.1 |
| 5,276,472 A | 1/1994 | Bell et al. | 354/76 |
| 5,359,374 A | 10/1994 | Schwartz | 354/76 |
| 5,367,332 A | 11/1994 | Kerns et al. | 348/61 |
| 5,379,159 A | 1/1995 | Lemelson | 360/35.1 |
| 5,384,674 A | 1/1995 | Nashida et al. | 360/72.2 |
| 5,387,955 A | 2/1995 | Cocca | 354/76 |
| 5,436,657 A | 7/1995 | Fukuoka | 348/232 |
| 5,446,599 A | 8/1995 | Lemelson | 360/35.1 |
| 5,499,465 A * | 3/1996 | Manico | 40/717 |
| 5,504,836 A | 4/1996 | Loudermilk | 395/2.81 |
| 5,521,663 A | 5/1996 | Norris, III | 354/106 |
| 5,533,290 A * | 7/1996 | Lee et al. | 40/717 |
| 5,555,098 A | 9/1996 | Parulski | 358/341 |
| 5,574,519 A | 11/1996 | Manico et al. | 396/429 |
| 5,614,946 A | 3/1997 | Fukuoka | 348/232 |
| 5,644,557 A | 7/1997 | Akamine et al. | 369/14 |
| 5,655,164 A | 8/1997 | Tsai | 396/312 |
| 5,657,074 A | 8/1997 | Ishibe et al. | 348/96 |
| 5,794,371 A * | 8/1998 | Camillery | 40/717 |
| 5,841,878 A * | 11/1998 | Arnold et al. | 40/717 |
| 5,956,682 A * | 9/1999 | Loudermilk et al. | 40/717 |
| 5,971,282 A * | 10/1999 | Rollender et al. | 235/492 |
| 6,069,402 A * | 5/2000 | Murohara | 257/679 |

OTHER PUBLICATIONS

"Slimming down: Thin, Flexible, Rechargeable Battery for Use," by Japan Echo, Inc., www2.nttca.com:8010/infoma/trends/honbun/ntj970701.html, downloaded Sep. 28, 1997.

"All–plastic battery unveiled," by Francis L. Crum; www.matmo.org/news/sections/archive/battery.html, downloaded Sep. 28, 1997.

"Rechargeable Lithium batteries," by Tudelft, www.stm.tudelft.nl/tac/theme_a..htm, downloaded Sep. 28, 1997.

"Dramatic Technology Breakthrough Yields Wafer thin Hi–fidelity Loudspeakers," by Varity Groups, New Transducer's Technologies (NXT) Limited, Jan. 10, 1997, www.nxt.co.uk/pr100197.htm, downloaded Sep. 28, 1997.

"Introducing World's First Flat Panel Speaker–Equipped High Fidelity Sound Notebook PC," by NXT, Aug. 5, 1997, www.nxt.co.uk/pr110897nec.htm, downloaded Sep. 28, 1997.

* cited by examiner

FIG. 4

PLAY AND RECORD AUDIO SYSTEM EMBEDDED INSIDE A PHOTOGRAPH

FIELD OF THE INVENTION

These inventions relate to miniature, embedded audio recording and play back systems and methods, and, in particular, to ultra-thin sized audio systems that are embedded into a photograph so that audio capability is provided within the photograph.

BACKGROUND OF THE INVENTION

It is known to provide photographs or pictures that store or contain audio information that may be played back through an external or separate device. See, e.g., U.S. Pat. Nos. 4,905,029; 5,655,164; 5,644,577 and 5,276,472. It is also known to provide recording devices or recording apparatuses attachable or communicable with a camera or still image device in order to allow audio information or sounds to be recorded or stored to a corresponding picture or photograph that is being taken by the camera or still image device. See, e.g., U.S. Pat. Nos. 5,521,663; 5,260,795; 4,983,996; 5,032,918; 5,644,557; 5,276,472; 5,655,164; 4,905,029.

It is further known to provide various forms of greeting cards that replay audio information. Examples of such audio greeting cards are disclosed in U.S. Pat. Nos. 5,063,698; 5,045,327; 4,381,558; 4,102,067; 4,828,105. These cards do not, however, allow a picture to be selectively taken and displayed as in a photograph. These cards also do not incorporate a feature to record or store or to provide the capabilities of recording or storing audio information or data within the cards themselves.

It is also known to provide picture frames or photo albums that store and/or play back audio information. Examples of such picture frames or photo albums are disclosed in U.S. Pat. Nos. 5,504,836; 5,359,374; 4,541,188; 5,574,519.

Additionally, it is known to provide still image ("slides") devices and still camera devices having audio capabilities and features, such as shown in U.S. Pat. Nos. 4,020,503; 5,032,918; 5,521,663; 5,260,795; 4,983,996; 4,473,280 and 5,063,587.

Each of the patents and articles discussed above is incorporated herein by reference.

A significant drawback of many of the previously known devices as discussed above is that they require separate or external devices to play back the stored audio information. These play back devices are cumbersome and/or inconvenient since they must be transported with the photographs or pictures in order to be used. Another significant drawback of the above devices is that they require separate or external devices to record or store the audio information, and the recorded/stored information must then be transferred and/or converted to the corresponding photograph or picture. Such devices do not allow or provide for audio information or data to be readily or flexibly recorded, stored, or changed within the photograph or picture.

Therefore, the need exists for a photograph or picture in which audio information may be directly recorded and played back from the photograph or picture without requiring external playback devices or even requiring external recording devices.

SUMMARY OF THE INVENTION

It is an object of the invention to provide an audio and image recording medium having an image area that records and displays at least one photographic or picture image and a self-contained audio recording and play back system attached or coupled to or embedded within the photograph or picture material to record and play audio information.

It is another object of the invention to provide an audio system that is coupled to the photographic or picture image.

It is another object of the invention to provide an audio photograph or picture having an embedded audio recording, play back and power supply systems.

It is another object of the invention to control the recording and playing of audio information on the audio and image recording medium directly thereon.

It is another object of the invention to couple an external source to the audio and image recording medium for controlling the recording and playing of audio information thereto.

It is an object of the invention to provide a photograph or picture with an embedded, ultra-thin, compact, and flexible audio system.

It is another object of the invention to provide a photograph or picture having an embedded audio system that is microprocessor controlled for storing and playing back audio information.

It is an object of the invention to provide a photograph or picture having an embedded audio system onto which the user is able selectively erase and record audio information.

It is another object of the invention to provide a photograph or picture having an embedded audio system that allows the user to temporarily record or store the audio information.

It is still another object of the invention to provide a photograph or picture having an embedded audio system that allows the user to play back the audio information to selectively decide to save or delete the temporarily recorded audio information.

It is still another object of the invention to provide a photograph or picture having an embedded audio system to which the user is able to permanently record or store the audio information.

The above and other objects are achieved by a photographic and audio recording and play back medium. An image recording area is located on an external surface of the photographic and audio recording and play back medium, and an audio recording system is carried by the medium. The audio system includes an audio receiver, an analog to digital converter, a digital memory, and a digital controller. The audio receiver has an input for audio sound and an output having an analog electrical signal that varies in accordance with variations in the audio sound received at the input. The analog to digital converter is coupled to the audio receiver and configured to convert the analog signals output from the receiver into corresponding digital audio data signal. The digital memory is operable to store digital audio data, and the digital controller is coupled to the analog to digital converter and to the digital memory and is programmed to direct the storage of digital audio data in the digital memory. The audio system further has an audio speaker and a digital to analog converter. The audio speaker has an input for a varying analog signal and an output for emitting audio sound that varies in accordance with variations in the analog signal input to the speaker. The digital to analog converter is coupled to the digital controller and the audio speaker, and the digital controller is programmed to read digital audio data from the digital memory, direct the read digital data to the digital-to-analog converter, and control the digital-toanalog converter to pass an analog signal to the input of the audio speaker which signal varies in accordance with variations in the digital audio data stored and read from the digital memory. A control switch controls the audio system. Preferably, the control switch is an electrical control switch and includes a secondary input that is activated by an external source, such as a camera or a switch on a camera in which the medium is carried.

The above and other objects are also achieved by a photographic and audio recording and play back medium having an image recording area located on an external surface of the medium and an audio recording system carried by the medium. The audio system has an audio input circuit, a digital memory, an audio output circuit, and a digital controller. The audio input circuit is configured to receive analog audio signals and generate digital audio output signals. The digital memory is operable to store digital audio data corresponding to the digital audio signals output from the audio input circuit. The audio output circuit includes a speaker and is configured to receive digital audio signals and emit through the speaker audible sounds corresponding to the digital audio signals. The digital controller is coupled to the audio input circuit, digital memory, and audio output circuit. The digital controller is programmed to direct storage of digital audio data in the digital memory, to read digital audio data from the memory, and to generate audible sound through the speaker corresponding to the digital audio data read from the memory.

The above and other objects are also achieved by a method of displaying photographic images and recording and playing back audio information or data. A photographic and audio recording and play back medium is provided. An image is recorded on an external surface of the medium, and an audio system is carried by the medium. Audio information or data is inputted to and outputted from the audio system. The audio system receives an input of audio information or data and provides an output having an analog electrical signal that varies in accordance with variations in the audio information or data received at the input. The analog signal output is converted into corresponding digital audio data signal. The digital audio data is stored into memory. The digital audio data is read from the digital memory, and an analog signal is passed to the input of an audio speaker which signal varies in accordance with variations in the digital audio data stored and read from the digital memory.

The preferred embodiments of the inventions are described below in the Figures and Detailed Description. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Detailed Description is not intended to indicate a desire to invoke the special provisions of 35 U.S.C. Section 112, paragraph 6 to define the invention. To the contrary, if the provisions of 35 U.S.C. Section 112, paragraph 6 are sought to be invoked to define the inventions, the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means or step, then the intention is not to invoke the provisions of 35 U.S.C. Section 112, paragraph 6. Moreover, even if the provisions of 35 U.S.C. Section 112, paragraph 6, are invoked to define the inventions, it is intended that the inventions be not limited only to the specific structure, material or acts that are described in the preferred embodiments, but in addition, include any and all structures, materials or acts that perform the claimed function, along with any and all known or later-developed equivalent structures, materials or acts for performing the claimed function.

For example, although the word "photograph" is used to describe the thin device or mechanism on which the still images is contained therein and displayed therefrom, any form of device or mechanism for recording or containing and displaying the still images is able to be used, as long as the device or mechanism is relatively thin and provides a surface for displaying the still images.

DETAILED DESCRIPTION

Figure 1:
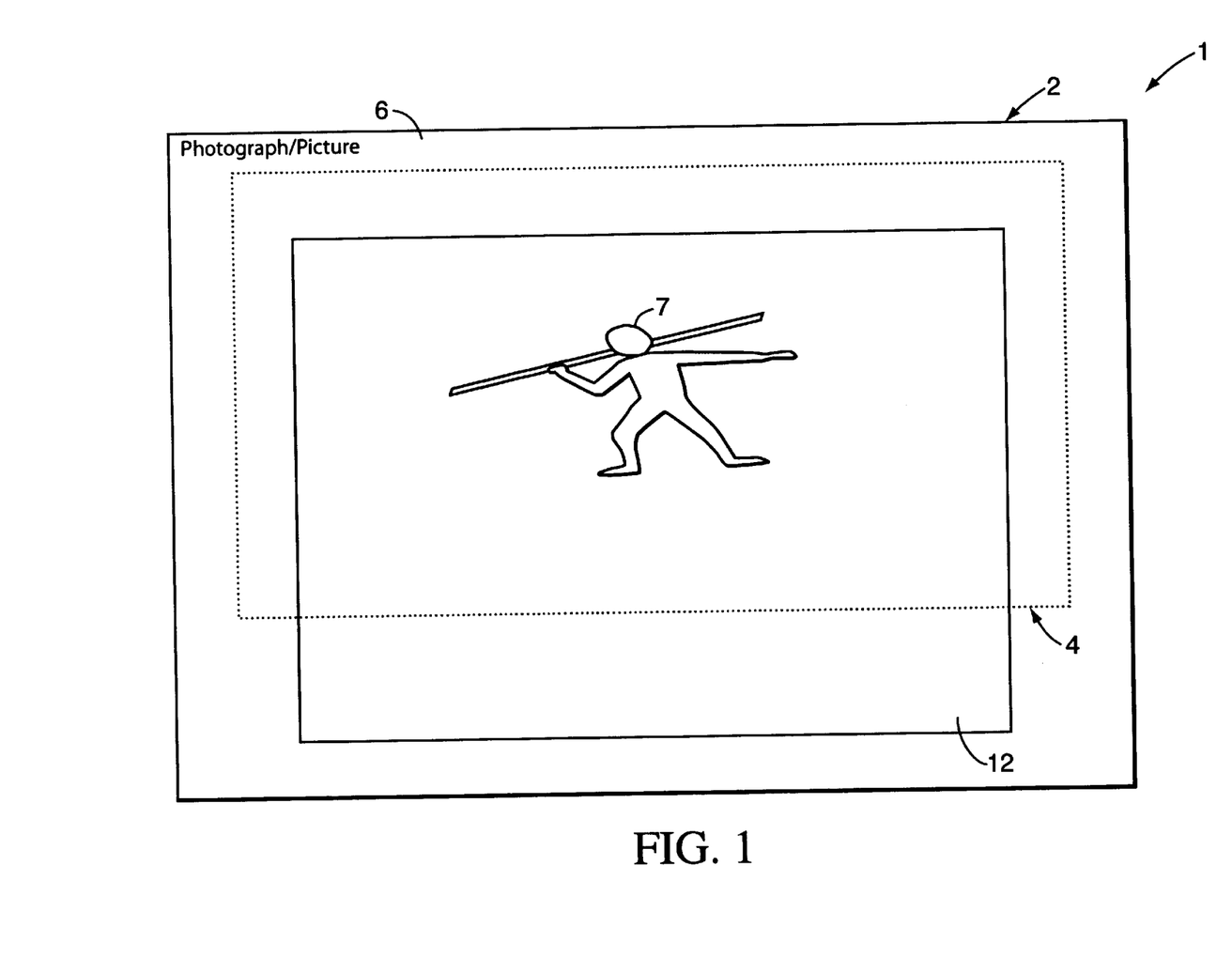
FIG. 1 is a front view of a photograph or picture with an audio system embedded therein.
Figure 3:
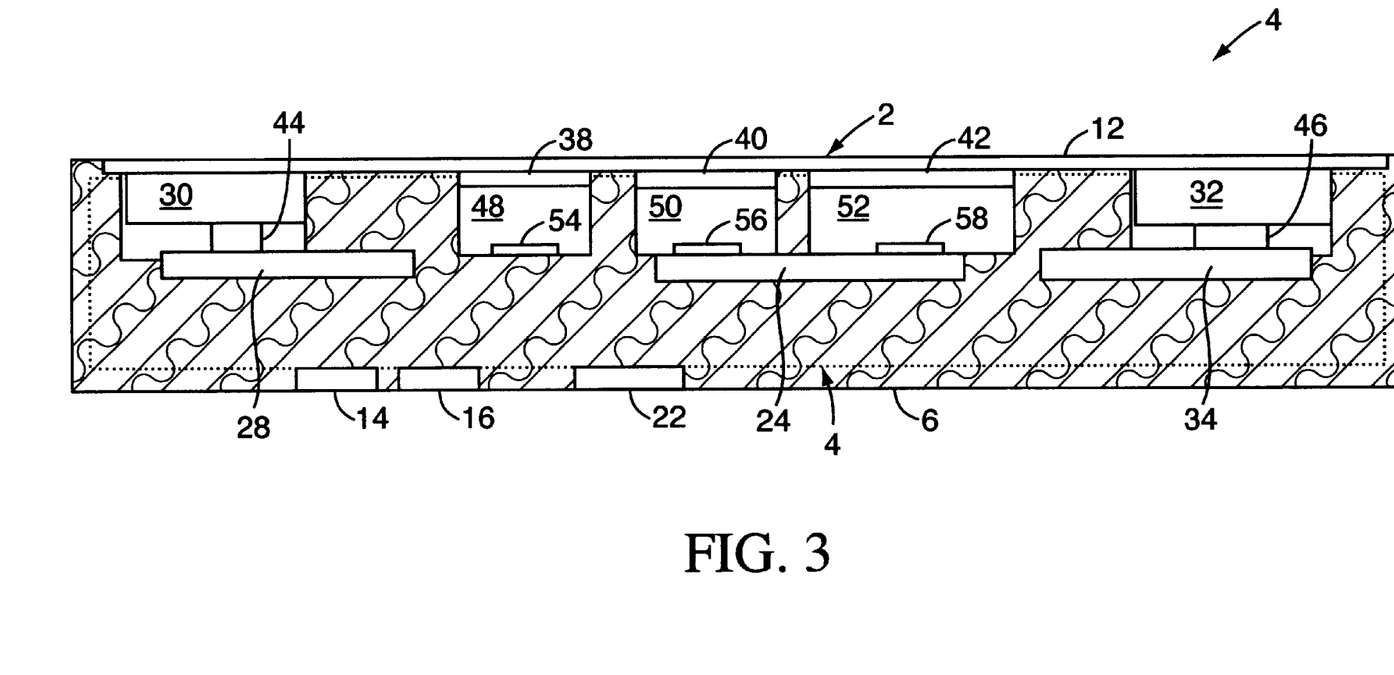
FIG. 3 is a representative cross-sectional view of the photograph or picture showing one respective configuration for the layout of the circuitry and components for the audio system that is embedded in the photograph or picture.

The present invention discloses a photographic and audio recording/play back medium 1. Referring to FIGS. 1 and 3, the photographic and audio recording/play back medium 1 comprises a photograph or picture 2 having a surface image area 12 and an embedded audio system 4 indicated by the dotted block. The image area 12 of the photograph or picture 2 provides an area on which image or images 7 are recorded, and the image area 12 is located on an external surface of the medium 1. The audio system 4 provides for at least the recording of audio information or sounds to a medium 1 that has the photograph or picture 2 to which the audio information or sounds is to correspond. The preferred embodiment of the audio system 4 also provides for the play back of audio information or sounds stored in the medium 1 for the photograph or picture 2. The audio system 4 is coupled or attached to the photograph/picture paper or material 6 of the photograph or picture 2. In its preferred embodiment, the audio system 4 is shown to be placed or formed between photograph/picture paper or material 6. The audio system 4 comprises ultra-thin, compact, and generally flexible components, and is a self-contained system that has power, full record, and play back capabilities. As a result, the audio picture invention does not require the use of separate or external systems or devices to record or play back audio information.

The audio system 4 may be at least partially embedded under the image area 12 that is located on an external surface of the medium 1 or may be at least partially carried by a border area that is out side of the image area 12. The circuitry and components of the audio system 4 may be either directly printed on or formed within the photograph material or paper 6, printed on ultra-thin circuit material and placed on the photograph material or paper 6, or formed as a separate unit where in the unit is bonded between the layers of the photograph material or paper 6. For example, techniques such as intelligent printing and the use of smart inks may be used for forming the circuitry and components of the audio system 4. See, e.g., "New intelligent printing techniques, A revolution in security, data handling, diagnostics and display," by Dr. Peter Harrop; "New intelligent printing techniques, A guide to exploiting new technologies," by Dr. Peter Harrop; "Slimming down: thin, flexible, rechargeable battery," by Japan Echo, Inc.; "All plastic battery unveiled," by Francis L. Crum; "Rechargeable Lithium batteries," by Tudelft; "Dramatic Technology Breakthrough Yields Wafer thin Hi-fidelity Loudspeakers," by Varity Groups, New Transducer's Technologies (NXT) Limited, Jan. 10, 1997; and "Introducing world's first flat panel speaker equipped high fidelity sound notebook PC," by NXT, Aug. 5, 1997.

Figure 2:
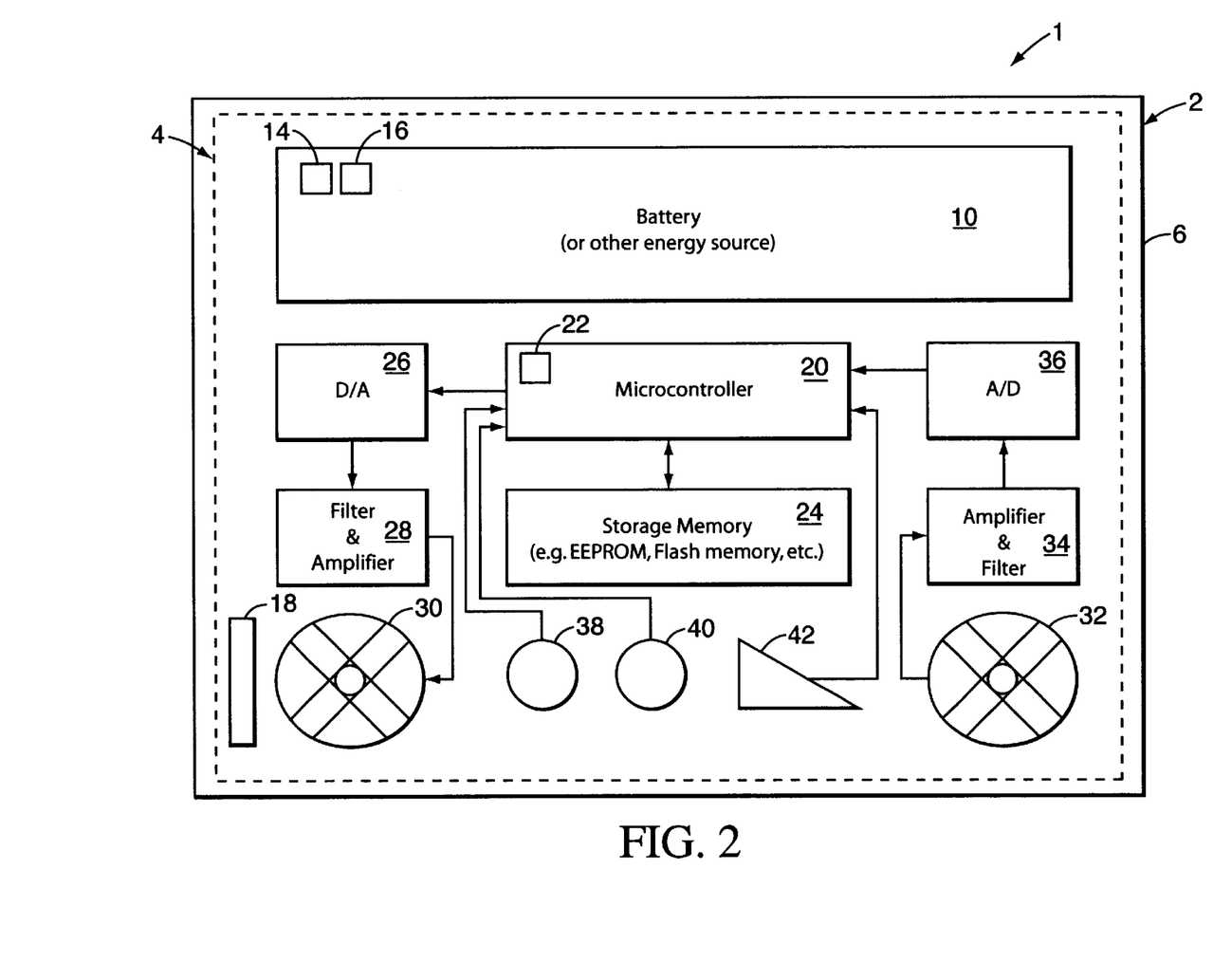
FIG. 2 is a diagram showing the circuitry and components for the audio recording and play back system which is embedded within the walls of the photograph or picture.

The audio system 4 includes an audio recording system. The audio recording system has at least an audio receiver or microphone 32, an analog to digital (A/D) converter 36, a digital memory 24, and a digital controller or micro-controller 20. The audio receiver 32 has an input for receiving audio sounds and an output for providing analog electrical signals that vary according to the variations of audio sounds received at the input. The AID converter 36 is coupled to the audio receiver and is configured to convert the analog signals from the output of the audio receiver 32 into corresponding digital audio data signals. The digital memory 24 operates to store the digital audio data signals from the A/D converter 36. The digital controller 20 is coupled to the A/D converter 36 and to the digital memory 24, and the digital controller 20 is programmed to direct the storage of the digital audio data signals into the digital memory 24.

The preferred embodiment of the audio system 4 also has an audio play back system. The audio play back system has at least an audio speaker 30 and a digital to analog (D/A) converter 26. The audio speaker 30 has an input for receiving varying analog signals and an output for outputting audio sounds that vary according to the variations of the analog signal input to the speaker 30. The D/A converter 26 is coupled to the digital controller 20, and the digital controller 20 is programmed to read digital audio data from the digital memory 24. The digital controller 20 also directs the digital audio data that has been read from the digital memory 24 to the D/A converter 26 and also controls the D/A converter 26 to provide or pass analog signals to the input of the audio speaker 30 which signals vary according to the variations in the digital audio data stored and read from the digital memory 24.

FIG. 2 shows a cross-sectional view of the general block systems for the audio system 4. FIG. 2 also illustrates the preferred layout or positioning of the ultra-thin circuitry and components of the audio system 4 between the walls of photograph/picture material or paper 6. The battery 10 is shown as a thin, flat rectangular box at the top of the photograph or picture 2. The battery 10 powers the audio system 4. The battery 10 may alternatively be solar cells or any other suitable energy or power source that is in a thin, flat form and capable of powering the audio system 4. A contact 14 that provides positive polarity and a contact 16 that provides negative polarity or ground are coupled to the battery 10 to allow the audio system 4 to be powered or the battery 10 to be recharged when needed or desired. A battery charge indicator strip 18 is located on the bottom left of the photograph/picture material or paper 6 of photograph or picture 2. The battery charge indicator strip 18 indicates to the user the level of charge remaining within the battery 10 and warns/notifies the user when the battery 10 needs to be recharged.

A micro-controller 20 for controlling the entire audio system 4 is located and shown in the center portion of the photograph/picture material or paper 6. An audio data contact 22 is coupled and located within the micro-controller 20 to allow audio information/data to be transferred to and from the photograph or picture 2. The audio data contact 22 allows for automated recording of quality sound into each individual photograph or picture 2 during the processing of the photograph or picture 2 from a still, digital, sound camera or instant camera with sound recording capability (i.e. cameras not shown). The audio information/data is saved into the storage memory 24 for future playback. The storage memory 24 comprises at least a temporary memory component (i.e. including but not limited to Random Access Memory (RAM)) and a permanent memory component (i.e. Erasable Programmable Read Only Memory (EEPROM)). Flash memory may also be used to store the audio recordings.

The audio information/data is stored into the storage memory 24 in digital form. The digital audio information/data needs to be converted into analog information/data in order for it to be heard by the user. A digital-to-analog (D/A) converter 26 is coupled to the micro-controller 20. The D/A converter 26 is used to convert the digital audio information/data to analog information/data signals. A filter and amplifier 28 is coupled to the D/A converter 26, and the analog audio signals are passed through this filter and amplifier 28. A piezoelectric speaker 30 is coupled to the filter and amplifier 28, and the filtered and amplified analog audio signals are outputted through the piezoelectric speaker 30 where it is heard by the user. The piezoelectric speaker 30 may also have the capabilities of a microphone.

In order for the audio system 4 to pick up and record audio information/data, a microphone 32 is shown coupled to the micro-controller 20 of the audio system 4. The microphone 32 is coupled to an amplifier and filter 34 for amplifying and filtering the analog audio information/data to the audio system 4. An analog-to-digital (A/D) converter 36 is coupled to the amplifier and filter 34, and the A/D converter 36 converts the analog audio information/data signals that are picked up by the microphone 32 to digital audio information/data. The A/D converter 36 is coupled to the micro-controller 20, and the micro-controller 20 processes the digital audio information/data for storage into the storage memory 24.

In the preferred embodiment, a control switch is included for controlling the operations of the audio system 4. The control switch is coupled to the digital controller 20, and the control switch initiates the controller 20 to read digital audio data from the digital memory 24. The control switch also initiates the directing of the read digital data to the D/A converter 26 and the controlling of the D/A converter 26 to provide or pass analog signals to the input of the audio speaker 30. The control switch is carried by the medium 1. The control switch may be a pressure sensitive switch that is activated by depression or applied pressure, and it is preferably an electrical switch. The control switch may also include a secondary input that is activated via a camera, an external remote switch unit, or some other external source. For example, a switch on the camera, the external remote switch unit, or the external source is coupled to the secondary input of the control switch of the audio system 4 carried by the medium 1. The switch on the camera, remote switch unit, or external source, in turn, is activated to initiate operations of the audio system 4 via the secondary input of the control switch. Furthermore, the shutter button of a camera may be the switch to activate the secondary input of the control switch. The control switch is coupled to the digital controller 20 and selectively initiates the controller 20 to store the digital audio data from the A/D converter 36.

Figure 4:
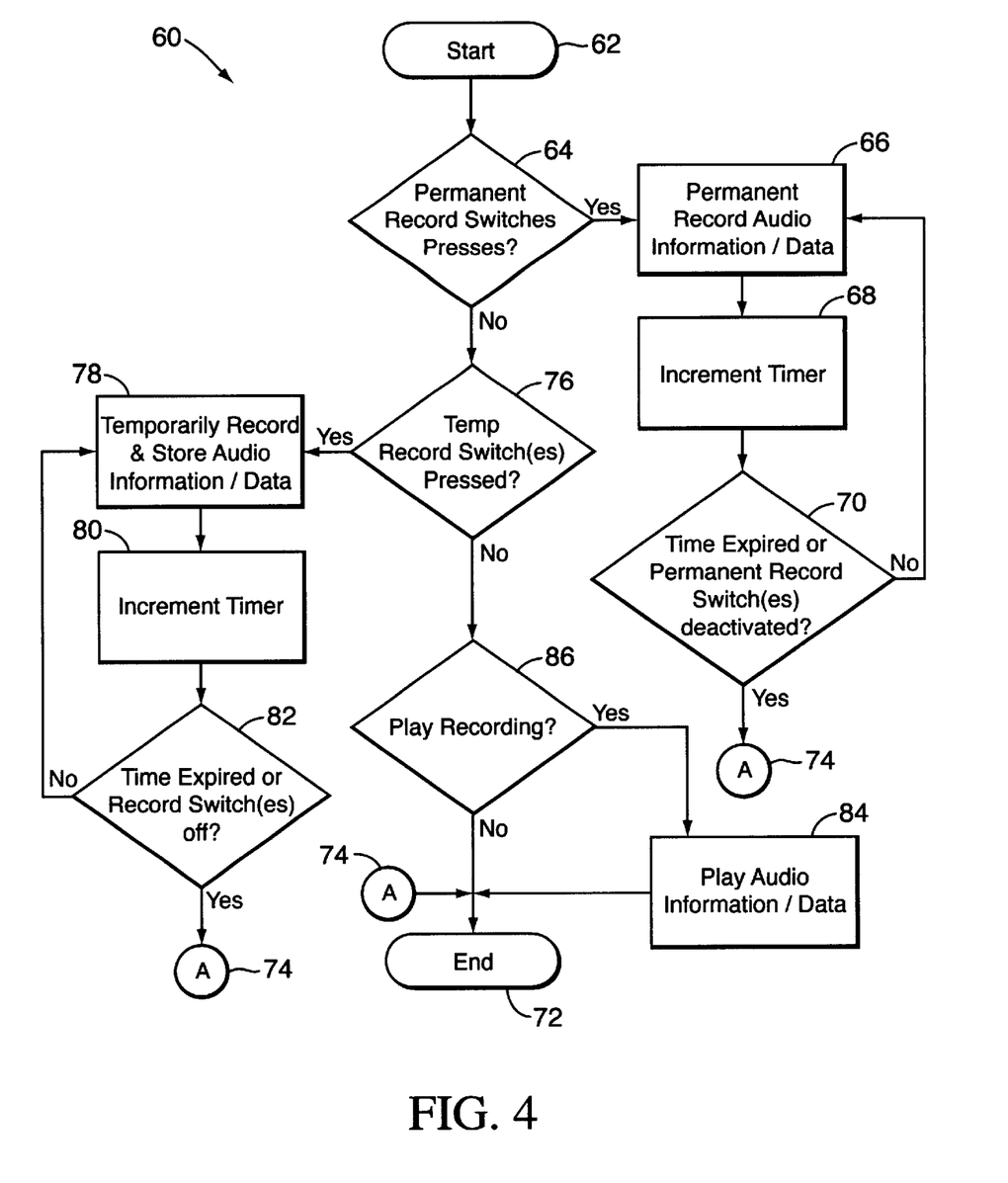
FIG. 4 is a flowchart of a method of recording and playing audio information from an audio system embedded in a photograph or picture.

Alternatively, FIGS. 2 and 3 show a micro record switch 38, permanent record switch 40, and play switch 42 that are located and shown at the bottom of the photograph/picture material 6 of photograph/picture 2, and these switches are coupled to the micro-controller 20 as shown in FIGS. 3 and 4. The micro record switch 38 is for temporarily recording audio information/data and sounds into the present invention photograph/picture 2. To activate the temporary recording feature, the user depresses the micro record switch 38, and the micro-controller 20 directs the audio information/data to be picked up by the microphone 32 to be converted, amplified, and filtered into digital information/data and then stored into the temporary memory component (i.e. RAM). In order to save the temporary recording as a permanent recording, a combination of the micro record switch 38, permanent record switch 40, and play switch 42 may be defined for such activation. When such combination of switches are activated, the micro-controller 20 directs the information/data in the temporary memory component (i.e. RAM) to be transferred to the permanent memory component (i.e. EEPROM). To activate the play back feature, the user depresses the play switch 42, and the micro-controller 20 directs the digital audio information/data stored in the storage memory 24 to be converted into analog audio information/data and filtered, amplified, and played through the speaker 30.

FIG. 3 shows a side cross sectional view of the present invention photograph or picture having image area 12. The components of the audio system 4 are shown embedded inside the photograph/picture material or paper 6. FIG. 3 shows example locations for the various components of the present invention photograph/picture 2. In FIG. 3, the audio system 4 is generally outlined as dotted rectangle at the center of the cross-sectional view of the photograph/picture 2. The speaker 30 and microphone 32 are shown on opposite sides of the cross-sectional view of the photograph/picture 2. The audio output circuitry for the amplifier and filter 28 are shown near the speaker contact 44, and electrical contact 44 couples speaker 30 to filter and amplifier 28. The audio input circuitry for the amplifier and filter 34 are shown near the microphone contact 46, and electrical contact 46 couples microphone 32 to amplifier and filter 34. As shown in FIG. 3, the micro record device 48, permanent record device 50 and play device 52 are located near the image area 12 and are respectively coupled to the record switch 38, permanent record switch 40 and play switch 42 which are activated by depressing the switches to respectively contact the bottom contacts 54, 56, and 58 respectively.

Circuitry for the memory storage 24 is positioned near the micro record contact 54, permanent record contact 56, and play contact 58. The positive battery contact 14, the ground battery contact 16, and audio data contact 22 are shown near the back surface of the photograph/picture material or paper 6 of the photograph/picture 2 where they are able to be easily accessed by external devices (i.e. devices for charging battery 10 and external audio devices for inputting or outputting audio information/data).

FIG. 4 shows a block diagram algorithm 60 for a preferred method of using the present invention photograph/picture 2 with audio system 4. The algorithm 60 includes subroutines for permanent record, temporary record, and audio play operations. The algorithm begins at the start block 62. The control of the algorithm 60 is then passed to the permanent record decision block 64 where it is determined whether the permanent record switch 40 and/or other predefined switches for a permanent record (e.g. record switch 38 and play switch 42 at the same time) has/have been activated. If the permanent record switch(es) has/have been pressed, control of algorithm 60 is passed to the permanent record and store audio information/data block 66 and then to an increment timer block 68. Program control of algorithm 60 is then passed to the decision block 70 to determine if the timer has expired or the user has activated or deactivated a permanent record switch(es) (e.g. permanent record switch 40, record switch 38, and/or play switch 42). If the timer has expired or the user has activated or deactivated a permanent record switch(es), then the record session finishes at end 72 via connector A 74. Otherwise, the permanent recording session continues by looping back to the permanent record and store audio information/data block 66 and continues through the operations in blocks 68 and 70 of the permanent recording session.

If the permanent record switch 40 and/or other predefined switch(es) for activating a permanent record session has/ have not been activated for recording, then control of the algorithm 60 is passed to temporary recording decision block 76 where it is determined whether the temporary record switch 38 and/or other predefined switch(es) for a temporary record (e.g. play switch 42 at the same time) has/have been activated. If the temporary record switch 38 with any other predefined switch (i.e. play switch 42 at the same time) for temporary record activation is/are depressed and activated, then algorithm control is passed to temporary store and record audio information/data block 78. For each audio information/data sample, the timer is incremented at block 80 for the temporary recording of the audio information/data. After each sample increment, control of the algorithm 60 is passed to the decision block 82 to determine whether the timer has expired or the user has deactivated the micro record switch 38 with any other predefined switch (i.e. play switch 42) where the temporary record session finishes at end 72 via connector A 74. If the temporary recording of audio information/data is not finished, then control of algorithm 60 is looped back to the temporary store and record audio information data block 78 and continues through the method operations in blocks 80 and 82 of the temporary recording session.

If only the play switch 42 is activated and the permanent record switch 40 and the micro record switch 38 have not been activated, then control of algorithm 60 passes to the play audio information/data block 84 via play decision block 86 where audio data is fetched from permanent or temporary memory storage 24 and converted to an analog audio signal. After the audio information/data has been played through the speaker 30, the play audio information/data session ends at block 72.

While the description and drawings describe a preferred embodiment, one having ordinary skill in the art will understand that numerous alterations in design can be made while still falling within the scope of the invention defined by the claims below. Several additions and alternatives are discussed below.

The present invention provides a photograph/picture 2 made of photograph/picture material or paper 6 providing an image area 12 and having an audio system 4 embedded therein. However, the inventions are believed applicable to many forms of photograph/picture material or paper and image areas 12, as long as such devices, systems and methods provide a flat, thin image surface.

Likewise, the preferred form of present inventions provide audio systems 4 that are embedded within the walls of the photograph/picture 2. However, the invention described herein is not to be limited to the specific audio system 4 in the preferred embodiment, but rather, is intended to be used in other applicable forms, as long as the audio system is self-contained and made flat, thin, and integral with or made at least part of the photograph/picture 2. Thus, the audio system may be made small enough to fit on a bottom, unused external portion of the photograph, or, alternatively, may form the back wall of the photograph.

Further, there are disclosed several components of the audio system 4 that perform various operations. For example, applicant divides the audio system 4 into several cooperating components. Similarly, the present invention discloses the use of an audio receiver or microphone, an A/D converter, a digital memory, a digital controller, an audio speaker, a D/A converter, a control switch, an electrical switch, a secondary input for a control switch, an audio input circuit, and an audio output circuit. However, the present invention is not limited to the use of these components, and any suitable components, circuits, or sub-systems may be used and/or combined together to be used in conjunction with the present invention in order to provide the recording and display of images and the recording and/or playing back of audio information or data which correspond to the respective recorded/displayed images.

The present invention also discloses using an external source such as a camera or remote switch unit that is coupled to the control switch via a secondary input in order to control the operations of the audio system 4. However, any suitable coupling arrangement and alternative external source for activation may be used with the present invention.

Furthermore, the present invention discloses methods of forming the circuitry and components of the audio system 4, such as directly printing or forming them within the photograph material or paper 6, printing them on ultra-thin circuit material and placing them on the photograph material or paper 6, or forming them and creating a separate unit wherein the unit is coupled to, attached to, or bonded between the layers of the photograph material or paper 6. Also, conventional techniques of forming the circuitry and components such as intelligent printing and the use of smart inks are disclosed. However, other appropriate well known techniques for forming ultra-thin or paper thin circuitry or components exist and may be used to form the circuitry and components of the present invention. Thus, it is not applicants' intention to limit their invention to any particular method or technique of forming the circuitry and components of the present invention.

What is claimed is:

1. Apparatus comprising:

(a) a medium including a image area on a flat external surface thereof, the image area being capable of (1) recording at least one photographic or picture image and (2) displaying the recorded image; and (b) a self-contained audio recording and playback system that is embedded inside the medium; wherein (c) the apparatus is capable of (1) recording sounds and at least one image and (2) playing back the recorded sounds and displaying the recorded image.

2. The apparatus of claim 1 wherein:

(a) the medium is photographic paper; and (b) the image is a photographic image formed on the paper.

3. The apparatus of claim 1 wherein the image is a picture image.

4. The apparatus of claim 1 wherein the audio system comprises ultra-thin, compact, and generally flexible components.

5. The apparatus of claim 1 further comprising an electrical switch that is controllably coupled to the audio recording and playback system, wherein the system is responsive to manual manipulation of the switch to record sound.

6. The apparatus of claim 5 further comprising an external input that is controllably coupled to the audio recording and playback system, wherein the system is responsive to a signal from an external source to record sound.

7. The apparatus of claim 6 wherein:

(a) the external source is a camera including a shutter button; and (b) the system is responsive to manual manipulation of the shutter button to record sound.

8. Apparatus comprising:

(a) a medium including a image area on a flat external surface thereof, the image area being capable of (1) recording at least one photographic or picture image and (2) displaying the recorded image; and (b) a self-contained audio recording and playback system that is printed directly on the medium; wherein (c) the apparatus is capable of (1) recording sounds and at least one image and (2) playing back the recorded sounds and displaying the recorded image.

9. The apparatus of claim 8 wherein:

(a) the medium is photographic paper; and (b) the image is a photographic image formed on the paper.

10. The apparatus of claim 8 wherein the image is a picture image.

11. The apparatus of claim 8 wherein the audio system comprises ultra-thin, compact, and generally flexible components.

12. The apparatus of claim 8 further comprising an electrical switch that is controllably coupled to the audio recording and playback system wherein the system is responsive to manual manipulation of the switch to record sound.

13. The apparatus of claim 12 further comprising an external input that is controllably coupled to the audio recording and playback system wherein the system is responsive to a signal from an external source to record sound.

14. The apparatus of claim 13 wherein:

(a) the external source is a camera including a shutter button; and (b) the system is responsive to manual manipulation of the shutter button to record sound.

15. Apparatus comprising:

(a) audio means for (1) recording sounds, and (2) playing back the recorded sounds; and (b) image means for (1) housing the audio means, (2) recording at least one photographic or picture image, and (3) displaying the recorded image.

* * * * *